US011239779B2

(12) United States Patent
Tuckey et al.

(10) Patent No.: US 11,239,779 B2
(45) Date of Patent: Feb. 1, 2022

(54) METHOD AND CONTROL SYSTEM FOR CONTROLLING A POWER CONVERTER

(71) Applicant: ABB Schweiz AG, Baden (CH)

(72) Inventors: Andrew Tuckey, Livingstone (AU); Simon Walton, Napier (NZ)

(73) Assignee: ABB Schweiz AG, Baden (CH)

( * ) Notice: Subject to any disclaimer, the term of this patent is extended or adjusted under 35 U.S.C. 154(b) by 814 days.

(21) Appl. No.: 15/908,231

(22) Filed: Feb. 28, 2018

(65) Prior Publication Data
US 2018/0269819 A1    Sep. 20, 2018

(30) Foreign Application Priority Data

Mar. 14, 2017    (EP) .................................... 17160732

(51) Int. Cl.
*H02J 3/38*    (2006.01)
*H02P 9/44*    (2006.01)
(Continued)

(52) U.S. Cl.
CPC .................. *H02P 9/14* (2013.01); *H02J 3/38* (2013.01); *H02P 9/02* (2013.01); *H02P 9/44* (2013.01)

(58) Field of Classification Search
CPC ....... H02P 9/14; H02P 9/44; H02J 3/38; H02J 2203/20; H02J 3/34; H02J 3/00;
(Continued)

(56) References Cited

U.S. PATENT DOCUMENTS 10,770,905 B2 *   9/2020  Sugimoto ................. H02J 3/48
2011/0270463 A1   11/2011  Weiss et al.
(Continued)

FOREIGN PATENT DOCUMENTS

CN    104377697 A    2/2015
CN    104701886 A    6/2015
(Continued)

OTHER PUBLICATIONS

Yan Du, Modelling, Analysis, and Design of a Frequency-Droop-Based Virtual Synchronous Generator for Microgrid Applications, 2013, IEEE, 1-7 (Year: 2013).*
(Continued)

*Primary Examiner* — Bickey Dhakal
(74) *Attorney, Agent, or Firm* — Whitmyer IP Group LLC

(57) ABSTRACT

A method of controlling a power converter, connected to an electrical grid, to mimic a synchronous generator, by: determining a frequency control error with respect to a setpoint and actual frequency of the grid, determining an input power to an inertia model of a synchronous generator based on the frequency control error, regulating by means of the input power a rotational frequency of the inertia model, determining a voltage control error with respect to a setpoint and actual voltage, determining an exciter parameter of a synchronous generator model based on the voltage control error, regulating by means of the exciter parameter an output voltage of the synchronous generator model, adjusting the rotational frequency or a phase angle obtained from the rotational frequency, and the output voltage based on a virtual impedance of a stator of the synchronous generator model, and controlling the power converter based on the adjusted rotational frequency or the adjusted phase angle and on the adjusted output voltage.

20 Claims, 1 Drawing Sheet

(51) Int. Cl.
*H02P 9/14* (2006.01)
*H02P 9/02* (2006.01)

(58) Field of Classification Search
CPC .... H02J 3/36; H02M 1/00; H02M 2001/0003; H02M 7/48
See application file for complete search history.

(56) References Cited

U.S. PATENT DOCUMENTS

| | | | |
|---|---|---|---|
| 2016/0006338 A1* | 1/2016 | Sakimoto | H02P 9/105 363/131 |
| 2018/0191281 A1* | 7/2018 | Zhong | F03D 9/25 |
| 2019/0222026 A1* | 7/2019 | Zhong | H02M 7/53871 |
| 2020/0083709 A1* | 3/2020 | Umezu | H02J 1/106 |

FOREIGN PATENT DOCUMENTS

| | | |
|---|---|---|
| CN | 104993521 A | 10/2015 |
| CN | 105207261 A | 12/2015 |
| CN | 105305491 A * | 2/2016 |
| CN | 105305491 A | 2/2016 |
| CN | 105429174 A | 3/2016 |
| CN | 106026196 A | 10/2016 |
| JP | H09261998 A | 10/1997 |
| JP | 2001112172 A | 4/2001 |
| JP | 2011193551 A | 9/2011 |
| JP | 2014168351 A | 9/2014 |
| JP | WO2014103192 A1 | 1/2017 |
| JP | WO2016157632 A1 | 10/2017 |
| WO | 2014132304 A1 | 9/2014 |

OTHER PUBLICATIONS

D'Arco; et al: "A virtual synchronous machine implementation for distributed control of power converters In SmartGrids", Electric Power System Research, vol. 122, 2015 pp. 180-197.
European Search Report Application No. 17160732.8 Completed Date: Sep. 18, 2017; dated Sep. 27, 2017 8 pages.
Japanese Office Action and Translation Application No. JP 2018 026831 dated Sep. 10, 2019 4 pages.
Japanese Office Action with Translation; Application No. 2018102093812; dated Nov. 23, 2020; 16 Pages.

* cited by examiner

METHOD AND CONTROL SYSTEM FOR CONTROLLING A POWER CONVERTER

TECHNICAL FIELD

The present disclosure generally relates to power converters. In particular, it relates to method of controlling a power converter to mimic a synchronous generator when connected to an electrical grid.

BACKGROUND

A power converter can be used as a power conversion system (PCS). A PCS can be used to convert electrical energy from one form to another, such as from ac to dc in which case it performs rectifier action or from dc to ac in which case it performs inverter action. If bidirectional flow is possible the PCS is usually referred to as a converter.

A PCS can be either current controlled or voltage controlled. When ac current controlled the current on the ac side of the converter is controlled to be at or close to a particular setpoint. An ac current controlled PCS can be referred to as a Current Source Inverter (CSI) since the ac current is similar to that coming from an ac current source. Similarly, when ac voltage controlled, the voltage on the ac side of the converter is controlled to be at or close to a particular setpoint. An ac voltage controlled PCS can be referred to as a Voltage Source Inverter (VSI) since the ac voltage is similar to that produced by an ac voltage source.

One use of a VSI is to create an ac electrical network or grid. The energy can come from an energy storage device, such as a battery or flywheel or super capacitor, or an energy producing device such as a generator. Since energy storage devices can be charged and discharged and VSIs are also bi-directional, the energy from an energy storage/VSI combination can be used by a load in which case they act as a generator or consumed from some other generation device in which case they act as a load. This ability to both produce and consume energy means the storage/VSI combination can create a grid and run as the only grid-forming device on the grid, i.e. stand-alone, or be used to stabilize the frequency or voltage of a grid formed by other devices.

If a VSI is given a fixed voltage and frequency setpoint and runs stand-alone there are no problems. However, if it runs in parallel with other voltage stiff devices, such as other VSIs or synchronous generators, then there are problems with these devices running in parallel.

A synchronous generator is the predominant power producing device in power systems. It comprises two parts: The prime mover and the synchronous machine. The prime mover is an energy conversion device which converts energy in some form such as steam or natural gas into rotational energy. The synchronous machine converts the rotational energy into ac electrical energy.

A synchronous generator is compliant, i.e. it initially reacts softly to load changes on it. This compliant behaviour occurs for both real load changes and reactive load changes. An example of a real power change is when the load increases on a synchronous generator, resulting in an initial dip in frequency. The speed or frequency controller, or governor, senses this speed decrease and responds by increasing the power output of the prime mover. This is usually done by increasing the fuel or steam flow into the prime mover. With the increased power output of the prime mover the speed and frequency is brought back to the setpoint. In the case of a reactive power load change, when the reactive load increases on a synchronous generator there is an initial dip in voltage. The automatic voltage regulator (AVR) senses this voltage decrease and responds by increasing the field current to the synchronous machine. This field current increase can be via a static or brushless excitation system. With the increased excitation the voltage output of the synchronous machine is brought back to the setpoint.

A standard VSI doesn't have the above compliance so it can be quite stiff.

There are problems when a standard VSI operates in parallel with another voltage source device, like a synchronous generator, another VSI, or a normal grid. These problems occur in both steady-state and during transients.

Voltage source devices, such as synchronous generators and VSIs that are operating in parallel and have the same frequency setpoint do not inherently share load; separate sharing algorithms are required. Similarly synchronous generators and VSIs that are operating in parallel and have the same voltage setpoint do not inherently share reactive load; separate reactive sharing algorithms are required.

During a load step the sharing between a VSI and generator is disrupted. If the generator has inertia and the VSI is a conventional type then the VSI will pick up the majority of the change in load. This puts a lot of stress on the VSI and may cause it to be overloaded, even if the total load is within the load capability of the combined VSI and generator.

When there is no fault and the system is at the steady-state, the generator and the VSI are operating in synchronism with each other with a static angle between the generator's internal emf and the VSI voltage. When there is a short circuit or fault on a power line, the line voltage on the network is suppressed to a lower value and the generators and VSIs connected to that line usually supply fault current. During the time that the voltage is suppressed the active power produced by the generators connected to the system changes from their pre-fault value; the generators speed up if the active power is lower, or slow down if the active power is higher. A normal VSI may or may not change its frequency, so the synchronism between the generator(s) and the VSI may be lost.

There are two problems that can occur due to this loss of synchronism. Firstly this loss of synchronism can cause the VSI and the generators to provide fault current at different phase angles, so the net current to the fault may be reduced from the sum, or even become zero, i.e. the VSI and generator fault currents are equal but out of phase. The second problem is that when the fault is removed there may be a large angle difference between the VSI and the generator which can cause large power flow between the generator and the VSI and/or large currents to flow. This can cause over-current and/or power protection devices to trip.

The standard conventional control methods used for VSIs don't have any mechanism to prevent the above issues.

The paper "A virtual synchronous machine implementation for distributed control of power converters in Smart-Grids" by D'Arco et al., Electric Power System Research 122 (2015), pp. 180-197, discloses an implementation of a virtual synchronous machine (VSM). The implementation is based on an internal representation of the synchronous machine inertia and damping behaviour, together with cascaded voltage and current controllers for operating a voltage source converter. The virtual synchronous machine is able to handle active load changes but provides poor voltage control, as there is no recovery mechanism in the event of a load step and it can therefore not act as a grid-forming device but only as a grid-following device.

SUMMARY

In view of the above, an object of the present disclosure is to provide a method of controlling a power converter which solves, or at least mitigates, the problems of the prior art.

There is hence according to a first aspect of the present disclosure provided a method of controlling a power converter, connected to an electrical grid, to mimic a synchronous generator, wherein the method comprises: determining a frequency control error with respect to a setpoint frequency and an actual frequency of the electrical grid, determining an input power to an inertia model of a synchronous generator based on the frequency control error, which inertia model mimics the inertia of a synchronous generator, regulating by means of the input power a rotational frequency of the inertia model, determining a voltage control error with respect to a setpoint voltage and an actual voltage output by the power converter, determining an exciter parameter of a synchronous generator model based on the voltage control error, regulating by means of the exciter parameter an output voltage of the synchronous generator model, adjusting the rotational frequency (f) or a phase angle (θ) obtained from the rotational frequency (f), and the output voltage (U) based on a virtual impedance of a stator of the synchronous generator model and controlling the power converter based on the adjusted rotational frequency or the adjusted phase angle (θ') and on the adjusted output voltage (U').

An effect obtainable by being able to control active power and reactive power changes by means of the rotational frequency control and the output voltage control using closed-loop feedback is that multiple power converters, each separately controlled by means of the method, can operate in parallel and share well, during the steady state, and during transients and during faults. It also allows for paralleling with synchronous generators and/or with renewable energy generators such as solar, wind, tidal, etc.

Furthermore, the "virtual generator" which controls the power converter can be tuned to have the same characteristics as the conventional generation so they don't lose synchronism during a line fault. Moreover, the "virtual generator" can be tuned to be as compliant or as stiff as desired, which means it can mimic synchronous generators larger or smaller than its power rating.

The power converter may furthermore operate as the sole voltage source in the grid and be the voltage and frequency reference which enables renewable energy sources to be used, both inverter connected, e.g. solar, and machine connected, e.g. wind turbine generators.

The power converter controlled by means of the method creates a positive sequence voltage source and is a good reference during line faults; the power converter can deliver fault current and maintain the rotating positive sequence voltage source.

According to one embodiment the virtual impedance includes stator leakage inductances and a stator resistance.

According to one embodiment the exciter parameter is an exciter current.

According to one embodiment the controlling involves utilising pulse width modulation.

According to one embodiment the power converter is a voltage source inverter.

There is according to a second aspect of the present disclosure provided a computer program comprising computer-executable components which when executed by processing circuitry of a control system causes the control system to perform the steps of the method according to the first aspect.

There is according to a third aspect of the present disclosure provided a computer program product comprising a storage medium including a computer program according to the second aspect.

There is according to a fourth aspect of the present disclosure provided a control system for controlling a power converter configured to be connected to an electrical grid, to mimic a synchronous generator, wherein the control system comprises: processing circuitry, and a storage medium comprising computer-executable components which when run on the processing circuitry causes the control system to: determine a frequency control error with respect to a setpoint frequency and an actual frequency of the power converter, determine an input power to an inertia model of a synchronous generator based on the frequency control error, which inertia model mimics the inertia of a synchronous generator, regulate by means of the input power a rotational frequency of the inertia model, determine a voltage control error with respect to a setpoint voltage and an actual voltage output by the power converter, determine an exciter parameter of a synchronous generator model based on the voltage control error, regulate by means of the exciter parameter an output voltage of the synchronous generator model, adjust the rotational frequency or a phase angle obtained from the rotational frequency, and the output voltage based on a virtual impedance of a stator of the synchronous generator model and control the power converter based on the adjusted rotational frequency or the adjusted phase angle and on the adjusted output voltage.

According to one embodiment the virtual impedance includes stator leakage inductances and a stator resistance.

According to one embodiment the exciter parameter is an exciter current.

According to one embodiment the control system is configured to control the power converter utilising pulse width modulation.

There is according to a fifth aspect of the present disclosure provided a power converter system comprising: a power converter, and a control system as according to the fourth aspect, configured to control the power converter.

According to one embodiment the power converter is a voltage source inverter.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

It is herein presented a method and control system which mimics the operation and behaviour of a synchronous generator. A "virtual generator" functionality is thus provided, which enables a power converter configured to be connected to an electrical grid parallel to, and share power with, conventional synchronous generators, but also with other power converters. Since both the power converter and the conventional generators have similar properties, sharing occurs both in the steady-state and in transients, the latter case utilising the full capabilities of all generating assets. Moreover, the "virtual generator" enables the power converter to operate as the only grid-forming component within an electric grid, being the electric grid frequency and voltage master and provides frequency and voltage regulation.

Figure 1:
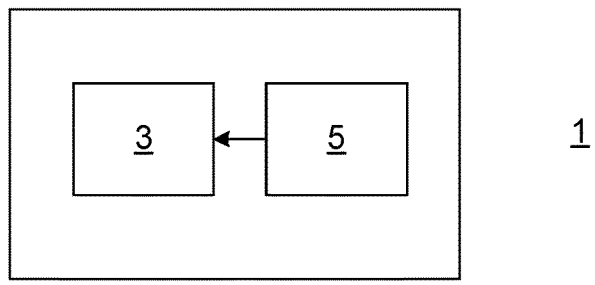
FIG. 1 schematically shows an example of a control system for controlling a power converter to mimic a synchronous generator.

FIG. 1 shows an example of a control system 1 for controlling a power converter to mimic a synchronous generator. The power converter may in particular be a voltage source inverter.

The control system 1 comprises processing circuitry 3 and a storage medium 5 comprising computer-executable components which when executed by the processing circuitry 3 causes the control system 1 to perform the method as will be disclosed in the following to mimic a synchronous generator.

The processing circuitry 3 uses any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning power converter control.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
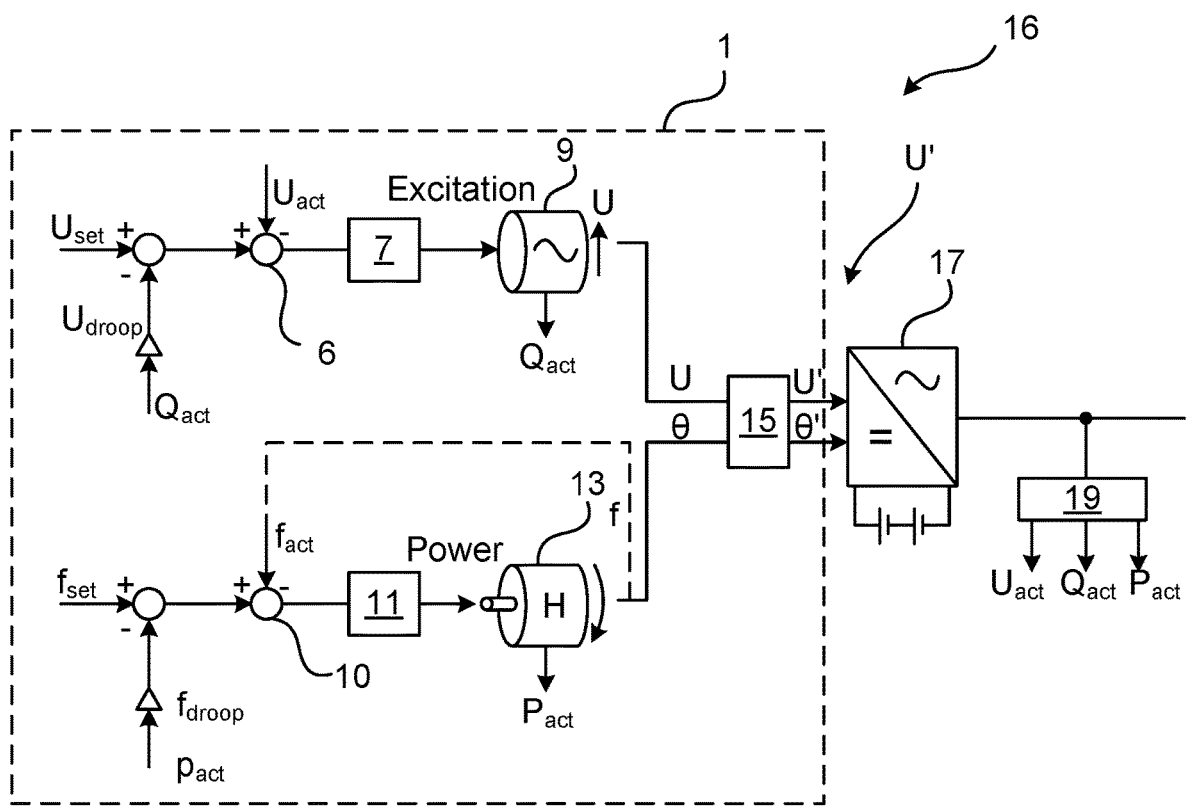
FIG. 2 schematically depicts a block diagram with modules implemented by the control system in FIG. 1 for controlling a power converter to mimic a synchronous generator.

FIG. 2 shows a power control system 16 including the control system 1 and a power converter 17 configured to be controlled by the control system 1 and to be connected to an electrical grid. In FIG. 2, there are shown a plurality of functional blocks typically implemented by the computer-executable components, or software, included in the storage medium 5 and configured to be executed by the processing circuitry 3.

The functional blocks provide both frequency control and voltage control of a power converter, with closed-loop feedback, whereby the power converter is able to act as a grid-forming device. The power converter is thus able to follow the load on the grid and adapt the output voltage and output frequency based on the actual reactive load and active load conditions.

Among the functional blocks, there is an automatic voltage regulator block 7 and a synchronous generator model block 9. The synchronous generator model block 9 includes a mathematical model of the excitation system of a synchronous generator. The output voltage of a synchronous generator is a function of the field current, i.e. the magnetisation current in the field windings of the rotor, and of the reactive power.

The control system 1 is configured to receive the actual voltage $U_{act}$ output by the power converter 17. The actual voltage $U_{act}$ that is output by the converter can for example be obtained by measurement at the terminals of the power converter 17.

The control system 1 is configured to determine a voltage control error with respect to the actual voltage $U_{act}$ output by the power converter 17 and a setpoint voltage $U_{set}$, as shown in adder block 6.

Optionally, according to one variation voltage droop $H_{droop}$ may be used to determine the voltage control error in adder block 6, as shown in FIG. 2.

The voltage control error is input to the automatic voltage regulator block 7. The automatic voltage regulator block 7 is a closed-loop controller. The automatic voltage regulator block 7 may for example comprise a PI-regulator.

The PI-regulator of the automatic voltage regulator block 7 may be provided with maximum and minimum reactive power limits and built-in integrator anti-windup. The dynamics of the PI-regulator may be set and an optional linear voltage droop can be used.

Based on the voltage control error, the automatic voltage regulator block 7 determines an exciter parameter, and regulates the output voltage U of the synchronous generator model block 9 by means of the exciter parameter. The exciter parameter can for example be the exciter current or the field current, i.e. the magnetisation current of the field windings of the rotor.

In this manner, the power converter may be controlled based on the output voltage U. In particular, the actual voltage $U_{act}$ that is output by the power converter 17 may be controlled, thereby providing adaptability to reactive power changes in the electrical grid.

Among the functional blocks, there is also a speed governor, or frequency governor, block 11 and an inertia model block 13. The inertia model block 13 includes an inertia model which is a mathematical model of the inertia of a synchronous generator, and can thus mimic the inertia of a synchronous generator. The inertia model has an inertia constant H, which indicates the amount of the spinning mass that it is representing and has unit of seconds. The inertia model may according to one variation also include a damping component, which is present in a synchronous generator. The damping component mimics the damping that exists in a synchronous generator. The rotational frequency of the inertia model is related to the power balance, i.e. the difference between the power going into the inertia, which is the input power, and the power coming out of it, which is the actual active power. When the input power going into the inertia model is less than the power delivered by the power converter, the frequency decreases. Conversely, if the input power is higher than the power coming out of it, the frequency increases. This is identical to a conventional synchronous generator with the prime mover providing the power, and the output power being that delivered by the synchronous generator.

The control system 1 is configured to receive an actual frequency $f_{act}$ of the power converter. The actual frequency $f_{act}$ may for example be measured at the output of the power converter. Alternatively, the rotational frequency f output by the inertia model block 13, may be used as the actual frequency $f_{act}$, as shown in FIG. 2.

The control system 1 is configured to determine a frequency control error with respect to the actual frequency $f_{act}$ and the setpoint frequency $f_{set}$, as shown in adder block 10.

Optionally, according to one variation frequency droop $f_{droop}$ may be used to determine the frequency control error in adder block 10, as shown in FIG. 2.

The frequency control error is input to the speed governor block 11. The speed governor block 11 is a closed-loop controller. The speed governor block 11 may for example comprise a PI-regulator.

The PI-regulator of the speed governor block 11 may be provided with maximum and minimum power limits and built-in integrator anti-windup. Typically, the power limits are set to the energy storage limit of the power converter 17 and can be asymmetric.

Based on the frequency control error, the speed governor block 11 determines an input power, and regulates the rotational frequency f of the inertia model included in the inertia model block 13 by means of the input power.

The phase angle θ is also obtained. The phase angle θ is closely related to the rotational frequency f; it is the integral of the rotational frequency f with some modification in case the damping component in the inertia model is present. Hence, the input power also regulates the phase angle θ. The rotational frequency f and the phase angle θ are provided as outputs from the inertia model block 13.

In this manner, the power converter may be controlled based on the rotational frequency f. In the present example, it is the phase angle θ derived from the rotational frequency f that is used for controlling the power converter. The power converter can thus be controlled to provide adaptability to active power changes in the electrical grid.

The control system 1 is configured to control the power converter 17 based on the rotational frequency f, in this example the phase angle θ derived from the rotational frequency f, obtained from the inertia model block 13 and based on the output voltage U obtained from the synchronous generator model block 9. This control may for example be by means of PWM, i.e. by using PWM for switching the switches, for example insulated gate bipolar transistors (IBGTs) of the power converter 17.

The output of the power converter may be filtered by a sine wave filter, creating a low-harmonic sinusoidal output entirely comparable to that of a conventional synchronous generator.

The output provided by the power converter 17 is a true voltage source. The real and reactive power delivered by the power converter 17 controlled by the control system 1 is related to the loads that are connected to it, if operated islanded, or its frequency setpoint and voltage setpoint relative to a macrogrid if grid-connected.

A power meter 19 may be provided to measure and capture the actual voltage $U_{act}$ output from the power converter 17, the actual active power $P_{act}$ and actual reactive power $Q_{act}$ and in certain examples also the actual frequency $f_{act}$, for use in the control loops described above.

In addition to the previously described functional blocks, there may also be provided a virtual impedance block 15. The virtual impedance block 15 includes a virtual impedance of a stator of the synchronous generator model. In particular, the virtual impedance may include stator leakage inductances and a stator resistance.

In a variation which includes the virtual impedance block 15, the output from the synchronous generator model block 9, i.e. the output voltage U, and an output from the inertia model block 13, in the present example the phase angle θ is provided into the virtual impedance block 15. Alternatively, the rotational frequency f could be provided as an input to the virtual impedance block 15. In this manner, the output voltage U is adjusted to obtain an adjusted output voltage U' based on the virtual impedance, and the phase angle θ is also adjusted to obtain an adjusted phase angle θ' based on the virtual impedance. The controlling of the power converter 17 is thus in this case based on the adjusted phase angle θ', and on the adjusted output voltage U'. If instead the rotational frequency f is input into the virtual impedance block, the rotational frequency f is adjusted based on the virtual impedance and the adjusted rotational frequency and the adjusted output voltage U' are used for controlling the power converter 17.

According to any variation disclosed herein it may be possible to change the characteristics of the function blocks adaptively in real time, i.e. adjust the parameters such as the inertia constant H, the gains Kp and Ki of the speed governor block and maximum and minimum limits of the speed governor block, to make the control system 1 controlled power converter mimic the characteristics of the conventional generators to enhance the ability to maintain synchronism during line faults.

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A method of controlling a power converter, connected to an electrical grid, to mimic a synchronous generator, by means of a control system, wherein the method comprises:
   determining a frequency control error with respect to a setpoint frequency ($f_{set}$) and an actual frequency ($f_{act}$) of the power converter,
   determining an input power to an inertia model of a synchronous generator based on the frequency control error, which inertia model mimics the inertia of a synchronous generator,
   regulating by means of the input power a rotational frequency (f) of the inertia model,
   determining a voltage control error with respect to a setpoint voltage ($U_{set}$) and an actual voltage ($U_{act}$) output by the power converter,
   determining an exciter parameter of a synchronous generator model based on the voltage control error,
   regulating by means of the exciter parameter an output voltage (U) of the synchronous generator model, and
   controlling the power converter based on the rotational frequency or a phase angle (θ) obtained from the rotational frequency and based on the output voltage (U),
   wherein characteristics of the control system are changed adaptively in real time to make the power converter mimic characteristics of conventional generators to enhance the ability to maintain synchronism during line faults.

2. The method according to claim 1, wherein the virtual impedance includes stator leakage inductances and a stator resistance.

3. The method according to claim 2, wherein the exciter parameter is an exciter current.

4. The method according to claim 2, wherein the controlling involves utilising pulse width modulation.

5. The method according to claim 2, wherein the power converter is a voltage source inverter.

6. The method according to claim 1, wherein the exciter parameter is an exciter current.

7. The method according to claim 1, wherein the controlling involves utilising pulse width modulation.

8. The method according to claim 1, wherein the power converter is a voltage source inverter.

9. A computer program including computer-executable components which when executed by processing circuitry of a control system causes the control system to perform the steps of:
determining a frequency control error with respect to a setpoint frequency ($f_{set}$) and an actual frequency ($f_{act}$) of the power converter,
determining an input power to an inertia model of a synchronous generator based on the frequency control error, which inertia model mimics the inertia of a synchronous generator,
regulating by means of the input power a rotational frequency (f) of the inertia model,
determining a voltage control error with respect to a setpoint voltage ($U_{set}$) and an actual voltage ($U_{act}$) output by the power converter,
determining an exciter parameter of a synchronous generator model based on the voltage control error,
regulating by means of the exciter parameter an output voltage (U) of the synchronous generator model, and
controlling the power converter based on the rotational frequency or a phase angle (θ) obtained from the rotational frequency and based on the output voltage (U),
wherein characteristics of the control system are changed adaptively in real time to make the power converter mimic characteristics of conventional generators to enhance the ability to maintain synchronism during line faults.

10. A computer program product having a storage medium including the computer program according to claim 9.

11. The method according to claim 9, wherein the virtual impedance includes stator leakage inductances and a stator resistance.

12. The method according to claim 9, wherein the exciter parameter is an exciter current.

13. A control system for controlling a power converter configured to connect to an electrical grid and mimic a synchronous generator, wherein the control system includes:
processing circuitry, and
a storage medium including computer-executable components which when run on the processing circuitry causes the control system to:
determine a frequency control error with respect to a setpoint frequency ($f_{set}$) and an actual frequency ($f_{act}$) of the power converter,
determine an input power to an inertia model of a synchronous generator based on the frequency control error, which inertia model mimics the inertia of a synchronous generator,
regulate by means of the input power a rotational frequency (f) of the inertia model,
determine a voltage control error with respect to a setpoint voltage ($U_{set}$) and an actual voltage ($U_{act}$) output by the power converter,
determine an exciter parameter of a synchronous generator model based on the voltage control error,
regulate by means of the exciter parameter an output voltage (U) of the synchronous generator model, and
control the power converter based on the rotational frequency or a phase angle (θ) obtained from the rotational frequency and based on the output voltage (U),
wherein characteristics of the control system are changed adaptively in real time to make the power converter mimic characteristics of conventional generators to enhance the ability to maintain synchronism during line faults.

14. The control system according to claim 13, wherein the virtual impedance includes stator leakage inductances and a stator resistance.

15. The control system according to claim 14, wherein the exciter parameter is an exciter current.

16. The control system according to claim 14, wherein the control system is configured to control the power converter utilising pulse width modulation.

17. The control system according to claim 13, wherein the exciter parameter is an exciter current.

18. The control system according to claim 13, wherein the control system is configured to control the power converter utilising pulse width modulation.

19. A power converter system including:
a power converter, and
a control system for the power converter, the power converter being configured to connect to an electrical grid and mimic a synchronous generator, wherein the control system includes:
processing circuitry, and
a storage medium including computer-executable components which when run on the processing circuitry causes the control system to:
determine a frequency control error with respect to a setpoint frequency ($f_{set}$) and an actual frequency ($f_{act}$) of the power converter,
determine an input power to an inertia model of a synchronous generator based on the frequency control error, which inertia model mimics the inertia of a synchronous generator,
regulate by means of the input power a rotational frequency (f) of the inertia model,
determine a voltage control error with respect to a setpoint voltage ($U_{set}$) and an actual voltage ($U_{act}$) output by the power converter,
determine an exciter parameter of a synchronous generator model based on the voltage control error,
regulate by means of the exciter parameter an output voltage (U) of the synchronous generator model, and
control the power converter based on the rotational frequency or a phase angle (θ) obtained from the rotational frequency and based on the output voltage (U),
wherein characteristics of the control system are changed adaptively in real time to make the power converter mimic characteristics of conventional generators to enhance the ability to maintain synchronism during line faults.

20. The power converter system according to claim 19, wherein the power converter is a voltage source inverter.

* * * * *